(12) United States Patent
Marcoux et al.

(10) Patent No.: US 6,597,782 B1
(45) Date of Patent: Jul. 22, 2003

(54) METHOD AND APPARATUS FOR PROVIDING CONTROL AND INPUT SENSING IN A SIGNAL TRANSFER POINT

(75) Inventors: Matt Marcoux, Plano, TX (US); Ignacio Linares, Plano, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/541,409

(22) Filed: Mar. 31, 2000

(51) Int. Cl.[7] ............................................. H04M 7/00
(52) U.S. Cl. .......................... 379/220.01; 379/221.1
(58) Field of Search ................ 379/220.01, 221.01, 379/221.08, 221.09, 221.1, 32.01, 32.03

(56) References Cited

U.S. PATENT DOCUMENTS 5,703,940 A * 12/1997 Sattar et al. ............ 379/201.05
6,341,064 B1 * 1/2002 Bradley ..................... 361/695

* cited by examiner

Primary Examiner—Benny Tieu
(74) Attorney, Agent, or Firm—V. Lawrence Sewell; Craig A. Hoersten

(57) ABSTRACT

A signal transfer point (STP) includes a plurality of control and sense points that enable the STP to collect sensory information of all types and to provide control of individual pieces of equipment. The STP is operable to generate reports that record the activity of external devices that are either being monitored or where operation is being controlled. Each sense and control point board provided within the STP is operable to provide up to 32 sense points and twenty-four control points in one described embodiment of the invention. The sense points are operable to detect either a low voltage condition or a high voltage condition. The sense points are operable to monitor up to 60-volt signals and thus may monitor telecom voltage levels for US (48 volts) as well as European systems (60 volts). The sense points are optically isolated to eliminate the possibility of unwanted current flows. The control points are relays capable of handling up to a 60-volt difference in potential in its switching operations.

15 Claims, 5 Drawing Sheets

US 6,597,782 B1

METHOD AND APPARATUS FOR PROVIDING CONTROL AND INPUT SENSING IN A SIGNAL TRANSFER POINT

TECHNICAL FIELD

The invention generally relates to telecommunications networks and more particularly to selecting sense point data and providing control for external devices.

RELATED ART

Advanced Intelligent Networks (AIN) are modern telephone networks that separate call control from the actual trunk that carries the voice or data transmission of a call. In general, AIN Networks include a system in which the network queries a database to determine how a call should be processed once a set of call digits have been received from a phone. AIN Networks generally include three basic elements. A signal control point (SCP) is a computer controlled database that is for storing customer specific information that is used by the network to determine how to route and/or process calls. A signal switching point (SSP) is a digital telephone switch that is operable to communicate with SCPs and to obtain the customers specific instructions for processing the call. A signal transfer point (STP) is a packet switch that shuttles messages between the SSPs and the SCPs. All three, namely the SCP, the SSP, and the STP communicate via what is known as out-of-band signaling. Out-of-band signaling generally refers to the signaling that is for controlling a call. In other words, out-of-band signaling does not include the actual call data or voice information. Typically, the three described systems utilize a signaling system No. 7 (SS7) protocol or a variant thereof.

When a call is dialed, the SSP creates a query to the database within the SCP to find out how a call should be processed. The query is passed via out-of-band signaling through at least one STP to the SCP. The SCP interprets the query based on criteria within its databases and based upon information provided by the SSP. Once the SCP retrieves and transmits a return message through the STPs to the SSP, SSP may properly process the call within the network.

The STP is, in essence, a router for the SS7 network. It relays messages through the network but does not originate them. It is similar to a voice switch except that it only routes control signals. STPs also serve as gateway devices that may convert messages that flow between dissimilar systems. For example, an STP within the United States may provide conversions between ANSI SS7 and ITU-T SS7. STPs may also provide other functionality including various security functions and message filtering wherein messages of a non-conforming nature are not passed through from one point to another. Other STP functions include traffic monitoring for billing purposes and for developing usage statistics.

Facilities that house STPs often also include many different engineering and system maintenance activities. For example, there are many different types of devices that are often used within the vicinity of an STP. Test boxes, monitoring the equipment, environmental equipment, and the like, are often operating within close physical proximity to an STP. Each of these devices, however, typically are stand alone units whose operational status can not be readily controlled or monitored. Thus, a need exists, for an STP that integrates the control and monitoring of such stand alone pieces of equipment.

SUMMARY OF THE INVENTION

A signal transfer point (STP) includes a plurality of control and sense points that enable the STP to collect sensory information of all types and to provide control of individual pieces of equipment. Additionally, the STP is operable to generate reports that record the activity of external devices that are either being monitored or where operation is being controlled. Historically, a STP had sense and control point boards that were designed for very specific applications and whose control and sensing capability were quite limited. For example, the sense and control point boards were for monitoring systems within the STP. Herein the present invention, however, each sense and control point board provided within the STP is operable to provide up to 32 sense points (opto-isolator inputs) and twenty-four control points (relays) in one described embodiment of the invention. The sense points are operable to detect either a low voltage condition or a high voltage condition and are operable to monitor up to sixty volt signals. The system is specifically designed so that it may detect high voltage conditions, e.g., a logic one, in a US telecom network in which a logic one consists of a forty-eight volt signal or in Europe wherein a logic one consists of a sixty volt signal.

DETAILED DESCRIPTION OF THE DRAWINGS

Figure 1:
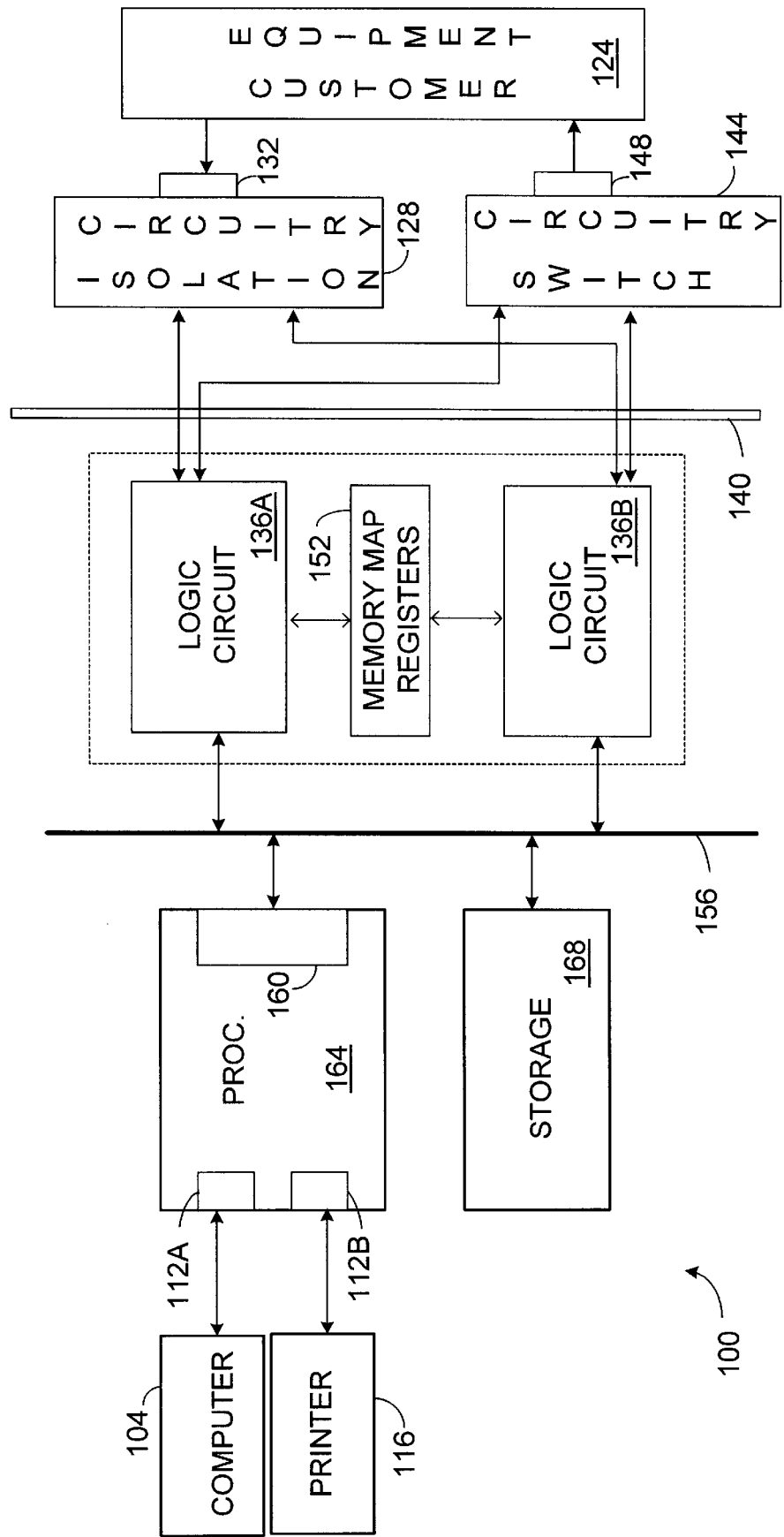
FIG. 1 is a functional block diagram of a signal transfer point that includes sense and control points circuitry according to a described embodiment of the present invention.

FIG. 1 is a functional block diagram of a signal transfer point that includes sense and control points circuitry according to a described embodiment of the present invention. Referring now to FIG. 1, a signal transfer point 100 is coupled to communicate with an external computer 104 that is coupled to a port 112A within the STP 100. STP 100 also is coupled to communicate with a printer 116 that is also coupled to the port 112B. STP 100 also is coupled to communicate with customer equipment through a plurality of ports. Specifically, STP 100 is coupled to receive signals having discrete values from customer equipment 124 and to transmit discrete voltages to energize the customer equipment 124. For example, customer equipment might comprise a humidifier, air condition equipment, door alarms, test equipment, or carrier banks (T1 spans that break into 24 different carriers). In general, the input and output ports of STP 100 have closed facilitate the monitoring and control of stand-alone equipment.

Internal to the STP 100, isolation circuitry 128 is coupled to receive input signals from an input port 132. In the described embodiment, isolation circuitry 128 comprises 32 opto-isolators that are each coupled to one pair of differential input lines of port 132. The isolation circuitry 128 also is coupled to the primary and the back-up logic circuitry 136A and 136B without receive and analyze input signals appearing at port 132.

An opto-isolator is a light emitting diode (LED) that is formed adjacent to a phototransistor and that is within closed proximity thereto. Whenever current flows in the light emitting diode, the radiated light is transmitted a few millimeters to the phototransistor to forward bias it and to produce collector current. Accordingly, opto-isolators serve to logically couple two circuits to create a logical node even though the two circuits are electrically isolated. Stated differently, the opto-isolator serves to optically couple two electrically isolated circuits. Thus, the use of the isolation circuitry allows internal logic devices to safely read input signals being originated from other sources to determine the logical state of the input signals. It may also be seen in FIG. 1, that the logic circuitry 136A and 136B are coupled to the isolation circuitry 128 by way of a back plane of 140 of the STP. In an alternate and preferred embodiment, the isolation circuitry 128 is on the same front side of the back plane 140 and can be separated from the port 132 by the back plane 140.

Similarly, the logic circuitry 136A and 136B also are coupled to communicate with switching circuitry 144 that also is coupled to a port 148. In the described embodiment, switching circuitry 144 comprises an array of relay switches whose open or closed status is a function of signals produced by the logic circuitry 136A or 136B. Which of the outputs of the switch circuitry 144 are coupled to pins of port 148. Thus, logic circuitry 136A or 136B may drive the output states of the switch circuitry 144 to drive the custom equipment 124. As with the isolation circuitry, it should be noted that the connections between the switch circuitry 144 and logic circuitry 136A or 136B are through the back plane 140. In an alternate and preferred embodiment of the invention, the switch circuitry 144 is on the front side of the back plane 140 and can be separated from the port 148 by the back plane 140.

Continuing to examine FIG. 1, logic-circuitry 136A and 136B are coupled directly to memory 152, respectively. Memory 152 is for storing state information for the signals received from isolation circuitry 128. Thus, in the described embodiment, logic circuitry 136A and 136B continuously monitor the input states of the signals being received by isolation circuitry 128. In the described embodiment, memory 152 is formed on the same card as the logic circuitry 136A and 136B.

The logic-circuitry reflects those received values within memory 152. Logic-circuitry 136A and 136B are also coupled to an internal PCI bus 156 as defined by the PCI Core technology of Xilinx. PCI bus 156 is controlled by PCI bus controller 160 that is, in the described embodiment, formed on a processor card housing processor 164. PCI bus controller 160 is also known as a "PCI Bridge Chip". Additionally, a PCI bus port 112 is coupled to PCI bus 156 transmitting data and control demands. Also coupled to the PCI bus 156 is a storage device 168. The storage device 168 includes computer instructions that define the operational logic for the signal transfer point 100. Processor 164 executes the computer instructions stored within storage device 168.

With respect to the isolation circuitry 128, each of the input is coupled to ILQ-74 opto-isolators. The opto-isolator inputs are reversed polarity protected by diodes and are current limited by 5.6K ohm resistors in the described embodiment. The negative terminal of the opto-isolators is connected to a logic ground. The positive terminal input may range from 0 to 60 volts DC. The logic-circuitry 136A and 136B are in the described embodiment, formed to interpret an input voltage signal between 0 and approximately 13 volts as a logic 0 and anything in excess of approximately 13 volts as a logic 1.

With respect to the switch circuitry 144, the circuitry includes 24 relays that provide both normally open and normally closed output pins. Accordingly, the logic-circuitry may be used to drive a normally open switch to a closed position or a normally closed switch to an open position according to the design logic formed within the logic circuitry, and according to the connections formed by the customer external to the port 148 of the STP 100.

Figure 2:
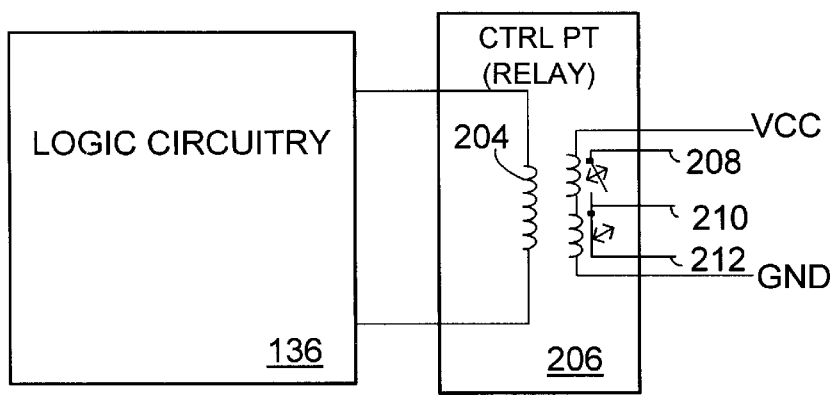
FIG. 2 is a functional block diagram of logic circuitry coupled to interact with a relay according to one embodiment of the described invention.

FIG. 2 is a functional block diagram of logic circuitry coupled to interact with a relay according to one embodiment of the described invention. As may be seen, logic-circuitry 136 is coupled to provide signals to coil 204 of relay 206 to close an internal switch to create a short between the normally open pin 208 and the common pin 210. Alternatively, logic-circuitry 136 may provide current to create an open between normally closed pin 212 and common pin 210. In the described embodiment, all three pins, namely 208, 210 and 212 are typically connected to port 148 to enable the customer equipment 124 of FIG. 1 to be coupled either to a normally open relay or to a normally closed relay as shown in FIG. 2 according to customer need. It is understood, of course, that different and known relay configurations may be used that enable one to select between normally open and normally closed positions in non-energized states.

Figure 3:
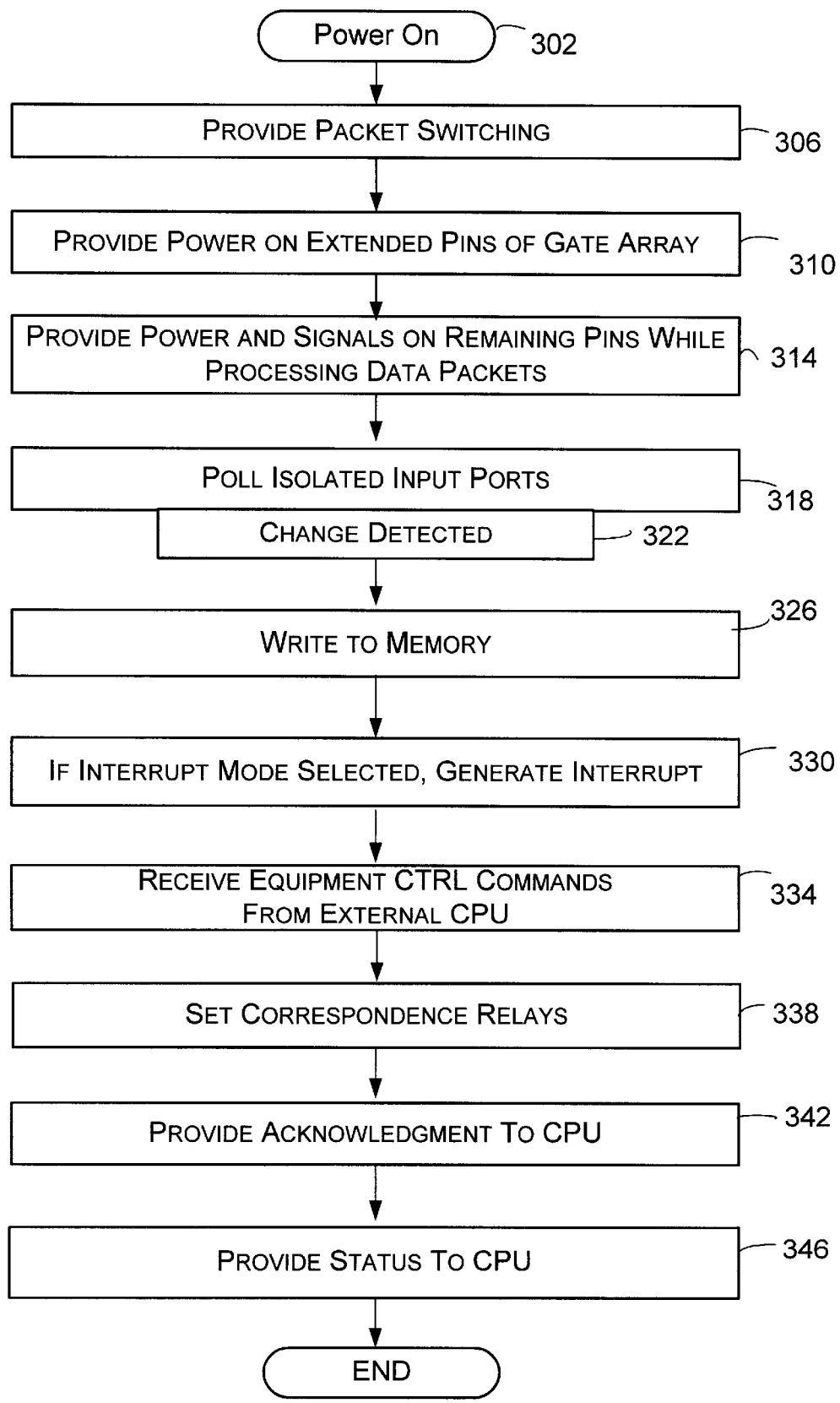
FIG. 3 is a flow chart illustrating a method formed by a signal transfer point for monitoring and controlling external devices.

FIG. 3 is a flow chart illustrating a method performed by a signal transfer point for monitoring and controlling external devices. Initially, the STP is powered on (step 302) and provides packet routing to facilitate the setup of telephone calls (step 306). Thereafter, as a control and sense point board is inserted into and is received by the STP, and power is provided to the extended pins of the field programmable array circuitry of the sense and control point board (step 310). Within the described invention, the control and sense point board includes a plurality of power pins that are longer than other pins so as to initially receive power and preliminarily charge its internal circuits so as to not impact the STP by providing an instantaneous drain therefrom.

Thereafter, the method includes providing power and signaling on the remaining pins while continuing to process data packets (step 314). At this point, the control sense point board is integrated into the STP, enabling it to operate as a signal transfer point as well as a monitoring and control system for external pieces of equipment that are frequently used along side telecommunications equipment. Thereafter, the STP, through its installed sense and control point board, polls the optically isolated input ports that are now coupled to the sense and control point board (step 318). The STP continues to poll the ports and eventually detects a change (step 322). The logical state of the change is stored in memory (step 326). If an interrupt driven mode of operation has been selected by a user, then an interrupt is generated every time an input change of state is detected (step 330).

In addition to monitoring inputs, the STP may also provide logical signals to control external devices. Accordingly, to properly control an external device, the STP must receive control commands or a program defining control logic that prompt it to generate control signals to the external device (step 334). Accordingly, at the appropriate time, the STP sets the corresponding relays (step 338).

According to the configuration between the control point outputs and the external equipment, the change in state driven by the program or the received control signal prompt the logic circuits 136A and 136B to drive a relay, when energized, to either provide an open signal or a closed signal. Thereafter, as an optional step, the STP provides an acknowledgment either to a memory location for later retrieval or, if in real time, to an external CPU (step 342). If the process steps were in fact stored in memory, then at a later point, the STP provides a status report to the external CPU (step 346).

In the described embodiment of the present invention, it is possible to also generate printed reports of monitored or controlled activity. In other words, the logic circuitry is operable to generate signals to an external printer through the PCI bus and through a port coupled to the printer to indicate every time that a monitored event occurs. Additionally, or alternatively, signals may be generated to an external computer 104 by way of the PCI bus and port 112 on the occurrence of either of these two events. Typically, a processor card includes a PCI controller 160 and port interface controller to enable a processor 164 to create communication links between external devices and internal devices that are coupled to the PCI bus.

In the described embodiment of the invention, the logic-circuitry 136A and 136B of FIG. 1, for example, is implemented in hardware by the hot swap capability mentioned herein. Accordingly, by implementing the system and hardware, the sense and control point board may be installed in a fully operating signal transfer point. Additionally, the sense and control point board is memory mapped to provide access by way of the PCI bus. Accordingly, the external computer 104, of FIG. 1, may, by specifying specific addresses, obtain status information for various inputs or signals received at input port 132 of FIG. 1. Similarly, external computer 104 may write to portions within the memory mapped I/O, at specified memory locations, to control the output state of a signal produced at port 148 of FIG. 1. Thus, while an STP is operating, an external computer may, by communicating through the PCI bus port of the STP, control external pieces of equipment including devices that effect the environment surrounding the STP.

While some prior art STPs do include sense and control point boards, they typically are not implemented in the manner described herein. Moreover, such sense and control point boards are included for the purpose of monitoring specific equipment within the signal transfer point. Herein, however, the sense and control point boards are being used to monitor equipment external to the STP. In addition, designing sense and control point boards that are accessible through a PCI bus and PCI bus port by an external computer greatly enhances the ability of the user to control various pieces of equipment that are often co-located with an STP.

Also, as shown in FIG. 1, the input ports and external ports 132 and 148, respectfully, are formed on the rear side of the STP. Accordingly, even though the sense and control point board is installed in a shelf on the front side of the STP, the sense and control point ports are on the rear thereby avoiding a need to connect the external equipment at the front of the signal transfer point. Thus, the external equipment may be placed in close proximity to the STP without interfering access to the card shelves in the front. Finally, the input voltage range of the opto-isolators used herein, make the described STP able to function either in a European or Northern American environment where the standard telecommunication voltage levels vary from 48 volts DC to 60 volts DC.

Figure 4:
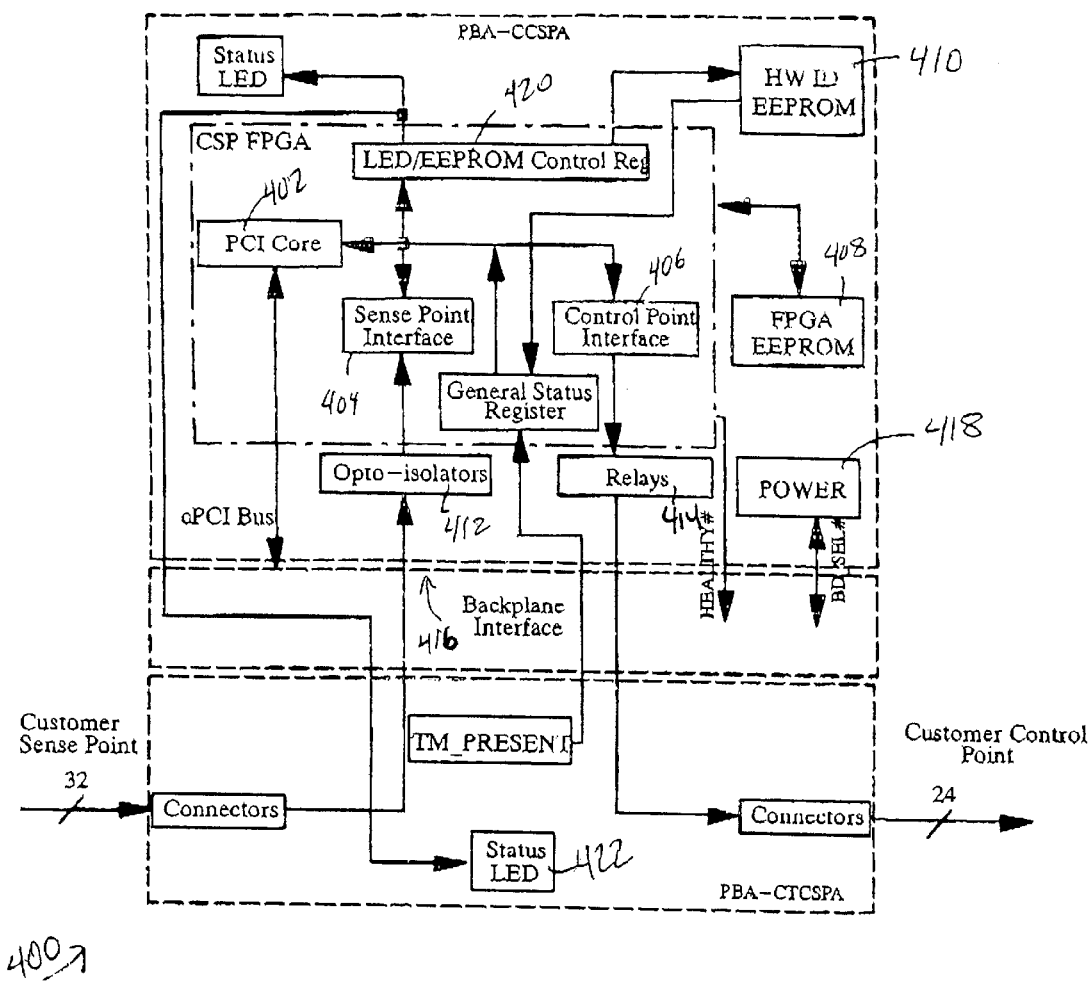
FIG. 4 is a detailed block diagram of a control and sense point system according to one embodiment of the described invention.

FIG. 4 is a detailed block diagram of a control and sense point system according to one embodiment of the described invention. Referring now to FIG. 4, a control and sense point system 400 includes a PCI core 402 that is a 32 bit, 33 MHz target PCI interface. All read and write transactions to internal registers are handled by PCI core 402 as well as all parity error and interrupt reporting. PCI core 402 connects directly to the PCI bus, moreover, the PCI core 402 supports Hot-Swap operation. A sense point interface is a set of read/write registers that are used to monitor the 32 general sense point inputs. System Software is operable to configure these registers of sense point interface 404 in order to set a status bit and, optionally, to generate an interrupt based on unique input criteria. In the described embodiment, an unconnected or non-driven input is interpreted as a logic 0 by the sense point hardware. Accordingly, such logic 0 for the unconnected or non-driven input is recorded as a 0 within the read/write registers of sense point interface 404.

A control point interface 406 is a read/write register that is used to drive the 24 control point outputs. During and after power-up, the register of control point 406 defaults to a logic 0 which leaves the control point relay windings in a non-energized state. This means that a normally closed contact will remain closed and a normally open contact will remain open. A Field Programmable Gate Array (FPGA) EEPROM 408 is a serially configured EEPROM that is used to load the control and sense point FPGA during power-up. A hardware ID EEPROM is a serial device that provides 512 bytes of storage for hardware identification purposes. The opto-isolators 412 include 32 inputs consisting of, in the described embodiment, ILQ-74 opto-isolators. These inputs are reversed polarity protected by 1N4004 diodes and current limited by 5.6K ohm resisters in the described embodiment.

The positive and negative terminal of the opto-isolators are available at the customer interface through the printed board assembly—compact transition control and sense point (PBA-CTCSPA) circuit card connectors. The negative terminal should be connected to a logic ground. The positive terminal input voltage may range from 0 to 60 volts DC. In order to fully "turn-on" the opto-isolators, a minimum of 2 milliamps must flow between the positive and negative terminals. If the impedance measured across the positive and negative terminals is 6500 ohms at 2 mA, an input differential of 13 volts is required to guarantee an "on" state. For excessively long cables, the input differential may need to be increased in order to account for additional resistance of the cables. The opto-isolators in the described embodiment should not be forward biased with a current greater than 15 mA. The relays 414 include buffered outputs from the control and sense point FPGA for controlling the windings of the 24 relays. The relay outputs, in turn, drive the control point outputs.

The common input to each relay is current limited to 65 mA. Both the normally open and normally closed terminals are available on the PBA-CTCSPA connectors. The FPGA will power-up such that the windings on the relays will not be energized.

The back plane interface 416 carries the compact PCI bus signals between the Program and Load Control Element (PLCE) and the PBA-CCSPA. It also carries the sense and control point signaling along with the transition module presence signal between the printed board assembly component control and sense point (PBA-CCSPA) circuit card and the PBA-CTCSPA circuit card.

A power monitor 418 is used to regulate the 3.3 volt and 5 volt power sources to the printed board assembly-CCSPA. The bus master residing on the same back plain as the PBA-CCSPA is operable to set a specified signal to a Hot-Swap controller effectively turning power on or off. A linear voltage regulator is used to convert 5 volts to 2.5 volts for the power supply for the CSP FPGA. While not shown explicitly herein FIG. 4, the printed board assembly includes long power pins on a J1 connector for receiving 3.3 volts from an external power source. The voltage received on the long power pins are used to pre-charge the lower cPCI regular case signals prior to insertion into the back plane. Pre-charging the cPCI signals minimizes the transient signals that can be induced during hot insertion. The 3.3 volt and 5 volt power planes are constantly monitored by the power monitor 418. The power monitor drives a reset signal to the CSP FPGA during an out-of-tolerance condition.

An LED EEPROM control register 420 is a read/write register that is used by software to control at least one status LED 422 on the face plate of the printed board assembly-CCSPA and the printed board-CTCSPA. The control register 420 is also used to drive control signals for the hardware identification EEPROM. A general status register 422 is a read only register that is used for storing specified status signals and the HW ID EEPROM read data. The functional connectivity for each of the above mentioned elements of FIG. 4 are shown in FIG. 4 and will not be described herein. With respect to the status LED 422, the LED is a bi-color LED that is capable of displaying both red and green colors. This system is formed to display a red indication once the CSP FPGA has been fully configured. The LED is turned to the green color by transmitting a logic 1.

Figure 5:
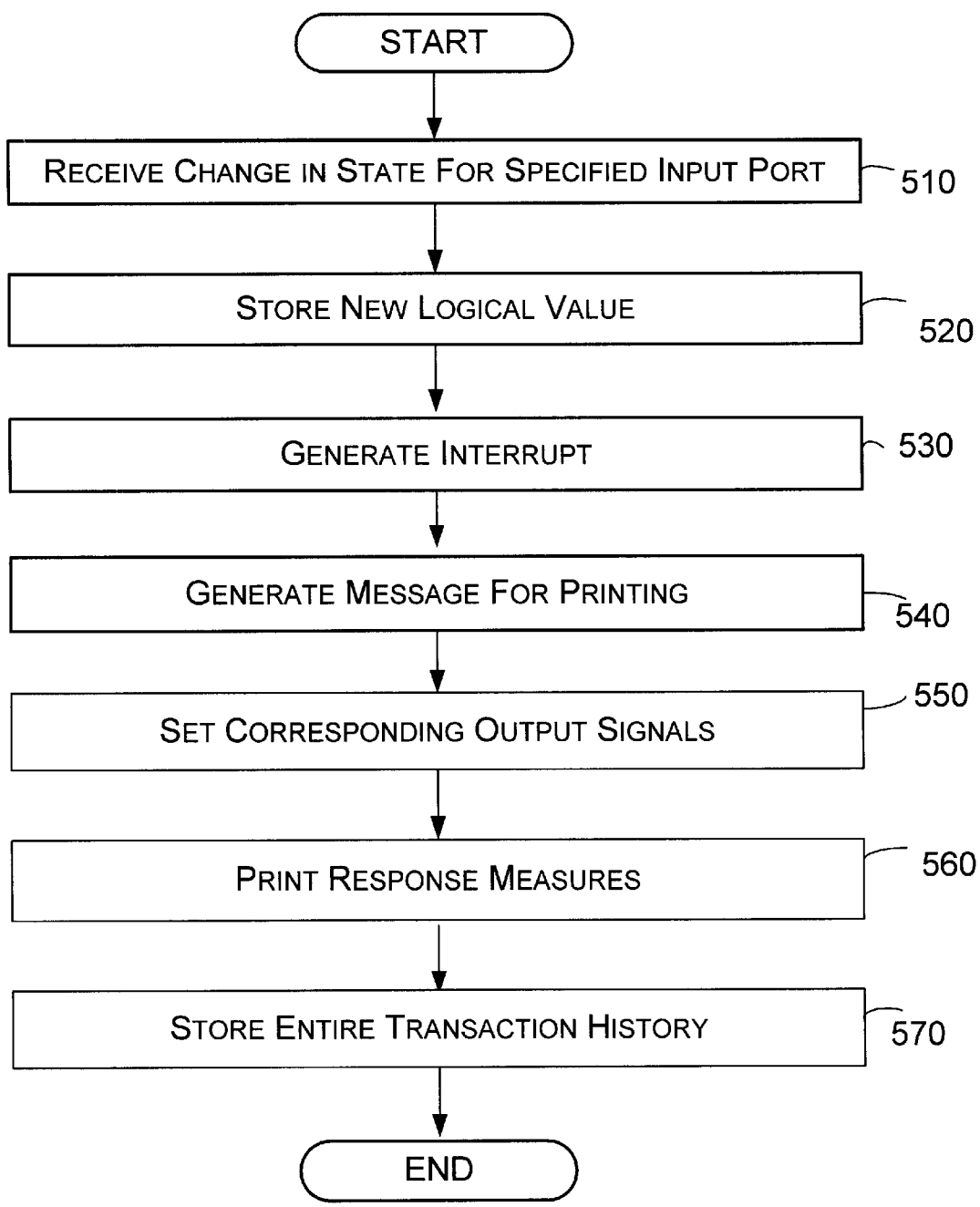
FIG. 5 is a flow chart illustrating a method performed within a signal transfer point for monitoring and responding to alarm conditions according to one embodiment of the present invention.

FIG. 5 is a flow chart illustrating a method performed within a signal transfer point for monitoring and responding to alarm conditions according to one embodiment of the present invention. Referring now to FIG. 5, a signal transfer point continuously monitors a plurality of input ports to determine and detect when a change in state has occurred on any specified input port (step 510). By way of example, the STP reads an input logical state for each specified port, compares it to a previous state and detects a change in state. Once the STP determines which input ports are changed, it stores the new logical values in a register that corresponds to the input port being monitored (step 520). Additionally, for the specified port that has changed values, the STP determines whether an interrupt should be generated to reflect the change in state (step 530). In the described embodiment of the invention, the interrupt driven system is optionally selectable by a user.

Similarly, the described invention includes enabling the STP to generate a message that is to be printed on a connected printer for specified state change conditions (step 540). For example, in one system, a report is to be generated every time a given door is opened or closed. Accordingly, at the end of a given shift, a operator may review the print outs to determine entry and exit through the monitored door. While alarm monitoring or door monitoring is not new, that it is done by an STP is new. Thus, a user of the STP may monitor whenever the room containing the STP is accessed.

In addition to the reporting steps 520, 530, and 540, the described invention also contemplates generating specified responses to a detected change of state for a monitored input. For example, the invention includes setting a specified input port to a logic 0 or a logic 1 according to the value of the input that has changed. By way of example, if a change in input represents a loss of power to an environmental control system, then the STP might generate a logic 1 to a switch to activate a backup environmental device. Thus, according to user control and programming, the STP sets corresponding output signals responsive to the received input signals (step 550). Thereafter, the STP prints the response measures taken (step 560) and stores the entire transaction history in memory (step 570).

Figure 6:
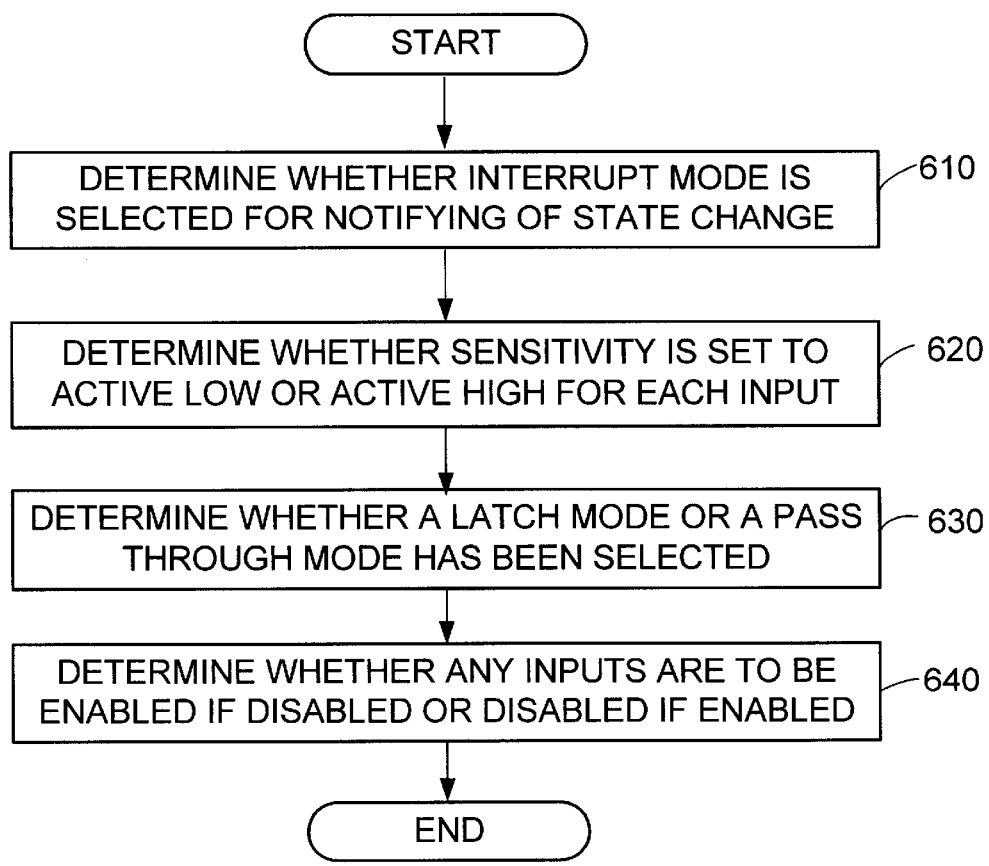
FIG. 6 is a flow chart illustrating a method performed within a signal transfer point for establishing modes of operation with respect to a sense and control point system therewithin according to one embodiment of the invention.

FIG. 6 is a flow chart illustrating a method performed within a signal transfer point for establishing modes of operation with respect to a sense and control point system therewithin according to one embodiment of the invention. Referring now to FIG. 6, circuitry within an STP initially determines whether an interrupt mode of operation has been selected for providing notification that a change in state for a monitored input line has occurred (step 610). If the interrupt mode is not selected, then a user would have to access a specified register in the memory mapped I/O registers to determine the state of a given input line.

The circuitry also determines whether sensitivity is set to read an active low as a logic 1 or an active high as a logic 1 and to report logic states accordingly (step 620). Additionally, the circuitry determines whether monitored input states are to be passed through and recorded on a realtime basis or whether a latched signal should be set on state transition changes (step 630). If the latched mode of operation is selected, then the reported state remains in that state until it is cleared or updated. Finally, the invention includes determining whether any of the enabled inputs are to be disabled or if any of the disabled inputs are to be enabled (step 640). For example, if an input has failed, it may be desirable to disable that input so the system does not have to continuously read the value for an invalid input.

Finally, it should be noted that each of these determinations may be made in several different manners including determining computer program settings, interpreting instructions received from an external computer by way of the PCI bus, or by interpreting settings on physical switches.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A signal transfer point having a compact PCI form factor for routing call set-up signals in an intelligent network, comprising:
   a port formed on a back portion of the signal transfer point for connecting to external equipment;
   control point circuitry for opening and closing connections for external pieces of equipment to control their operation; and
   sense point circuitry for monitoring the operation or state of equipment and circuit elements of external pieces of equipment.

2. The signal transfer point of claim 1 further including a plurality of opto-isolators to provide isolation between the signal transfer point and the external equipment.

3. The signal transfer point of claim 1 wherein the plurality of opto-isolators to provide isolation between the signal transfer point and the external equipment is equal to 32 opto-isolators for each of 32 sense points.

4. The signal transfer point of claim 1 further including a plurality of relays whose output state is driven by the signal transfer point control point circuitry.

5. The signal transfer point of claim 1 wherein the plurality of relays whose output state is driven by the signal transfer point control point circuitry is equal to 24 relays, one for each of 24 control points.

6. A method for monitoring alarm conditions and generating corresponding response within a signal transfer point comprising:

receiving an input signal and detecting a change of state in the input signal at a specified input port;

storing the new logical value in a memory register;

optionally, generating an interrupt to advise an external system of the change in state;

generating a message that is to be printed and outputting the message to a printer port;

optionally setting corresponding outputs signals on an output port to trigger a specified action in an external device;

printing a record of the response measures; and storing the entire transaction history.

7. The method of claim 6, wherein the signal transfer point monitors 32 different input parts for changes in state of input signals.

8. The method of claim 7, wherein the STP determines which of 24 different outputs points are to be used for generating output signals.

9. The method of claim 7, wherein the STP receives a signal from an external controller that specifies whether an interrupt is to be generated for a given alarm condition.

10. The method of claim 2, wherein the STP receives a control signal from an external device that specifies whether a message is to be generated for a given alarm condition.

11. A signal and transfer point system, comprising:

a first sense point circuit portion for defining sense point operation logic;

a second sense point circuit portion coupled to the first sense point circuit portion for providing optical isolation between the first sense point control circuit and external circuitry;

a plurality of connector pins having different lengths to support a hot swap for at least one active card;

a first control point circuit portion for defining control point operation logic;

a second control point circuit portion coupled to the first control point circuit portion for providing control signals to external equipment; and signal transfer point circuitry for providing call setup control data signal packet processing.

12. The signal transfer point of claim 11 further including a plurality of opto-isolators to provide isolation between the signal transfer point and the external equipment.

13. The signal transfer point of claim 12 wherein the plurality of opto-isolators to provide isolation between the signal transfer point and the external equipment is equal to 32 opto-isolators for each of 32 sense points.

14. The signal transfer point of claim 11 further including a plurality of relays whose output state is driven by the signal transfer point control point circuitry.

15. The signal transfer point of claim 14 wherein the plurality of relays whose output state is driven by the signal transfer point control point circuitry is equal to 24 relays, one for each of 24 control points.

* * * * *